US006515574B1

(12) United States Patent
Herbert et al.

(10) Patent No.: US 6,515,574 B1
(45) Date of Patent: Feb. 4, 2003

(54) TAMPER DETECTION

(75) Inventors: Raymond John Herbert, Leigh-on-Sea (GB); Daniel John Lee, Brentwood (GB)

(73) Assignee: Neopost Limited, Romford (GB)

( * ) Notice: Subject to any disclaimer, the term of this patent is extended or adjusted under 35 U.S.C. 154(b) by 0 days.

(21) Appl. No.: 09/237,814

(22) Filed: Jan. 27, 1999

(30) Foreign Application Priority Data

Jan. 30, 1998 (GB) ............................................ 9802125

(51) Int. Cl.[7] ................................................ G06F 7/00

(52) U.S. Cl. ......................... 340/5.3; 340/5.3; 340/541; 340/545.6; 340/550; 70/416; 70/439

(58) Field of Search ................................ 340/5.3, 5.31, 340/541, 545.6, 550, 506; 361/672; 70/333 R, 416, 439

(56) References Cited

U.S. PATENT DOCUMENTS

| | | | | |
|---|---|---|---|---|
| 3,866,198 A | | 2/1975 | Cohen | |
| 4,242,670 A | | 12/1980 | Smith | |
| 4,709,153 A | * | 11/1987 | Schofield | 250/353 |
| 4,845,470 A | | 7/1989 | Boldt, Jr. | |
| 5,608,377 A | * | 3/1997 | Zhevlev | 340/506 |
| 5,675,319 A | * | 10/1997 | Rivenberg et al. | 340/550 |

FOREIGN PATENT DOCUMENTS

| | | | |
|---|---|---|---|
| EP | 0099571 | | 2/1984 |
| GB | 2 211 645 A | | 7/1989 |
| GB | 2213302 | | 8/1989 |
| GB | 2249651 | * | 11/1990 |
| GB | 2 249 651 A | | 5/1992 |
| GB | 2 284 696 A | | 6/1995 |
| GB | 2 315 586 A | | 2/1998 |
| WO | 89/06302 | | 7/1989 |
| WO | 91/08597 | | 6/1991 |
| WO | WO 97/35186 | | 9/1997 |

* cited by examiner

*Primary Examiner*—Michael Horabik
*Assistant Examiner*—Vernal U Brown
(74) *Attorney, Agent, or Firm*—Shoemaker and Mattare

(57) ABSTRACT

A tamper evidence device for a secure housing containing electronic circuits includes a zinc air cell and a bi-stable latch circuit connected to be powered by the cell. The zinc air cell requires a supply of oxygen for activation of the cell. Normally when the secure housing is intact and unbreached, a pad seals an aperture for ingress of oxygen to the cell and the cell does not generate any electrical power. However if the secure housing is opened or otherwise breached the pad is displaced and oxygen enters the cell and electrical power is generated to power the latch circuit and thereby set the bi-stable latch circuit to provide evidence of the breaching of the secure housing.

7 Claims, 1 Drawing Sheet

TAMPER DETECTION

This invention relates to tamper detection and in particular to detection of attempts to tamper with secure equipment, for example postage meters.

Postage meters are provided for the metering of postage charges applied to postal items. The postage meter includes electronic circuit for carrying out accounting functions to maintain an accurate record of funds available for franking postal items and to decrement those funds with postal charges applied to items. The postal authority is dependent upon the accounting circuits of the postage meter to ensure proper payment by a user of the postage meter for the value of postage charges used and applied to postal items. Accordingly it is well known to ensure that the accounting circuits are maintained in a secure manner to prevent fraudulent attempts to effect mal-functioning of the accounting circuits with the intent to obtain postage value without making a corresponding payment for that value to the postal authority. The accounting circuits are maintained secure by housing the accounting circuits in a secure housing. The housing is sealed so that it is necessary to break the seal in order to gain access to the circuits within the housing. Accordingly if the seal is broken it indicates that an unauthorised attempt has been made to gain access to the interior of the housing and the circuits contained therein. The need to remove and replace seals when authorised access is required to the interior of the housing is inconvenient and furthermore replacement of a seal by an unauthorised replacement seal may not be detected.

SUMMARY OF THE INVENTION

According to the present invention tamper detection apparatus for detection of unauthorised access to an element housed within a secure housing includes at least one sensor located within the secure housing and responsive to opening of said housing.

BRIEF DESCRIPTION OF THE DRAWING

An embodiment of the invention will be described hereinafter by way of example with reference to the accompanying drawings, in which:

DESCRIPTION OF THE PREFERRED EMBODIMENT

Figure 1:
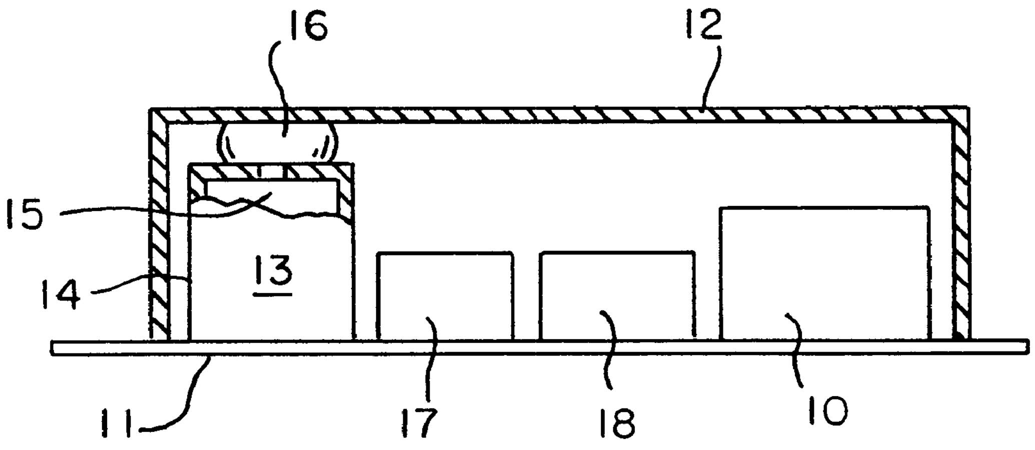

Referring to FIG. 1 it is required that unauthorised access to an electrical circuit element 10 is prevented or, if unauthorised access to the element is obtained, that evidence of such access is provided. The electrical circuit element 10 is mounted on a substrate 11 and securely housed in a secure enclosure formed by the substrate 11 and a cover 12. In order to permit authorised access to the element 10, the cover 12 is removably secured to the substrate 11 by means not shown. A zinc air cell 13 is located within the enclosure. The zinc air cell relies on the presence of oxygen to form a cathode. Accordingly a casing 14 for the zinc air cell has an aperture 15 therein to permit the ingress of oxygen for the operation of the cell. When the aperture is closed, oxygen within the cell becomes depleted and the cell becomes inactive. A resilient pad 16 is mounted on the inside of the cover 12 and is so located that, when the cover is in a closed position as shown in the drawing, the pad 16 extends across and seals the aperture 15 of the cell. Accordingly while the cover is closed the cell is inactive. However when the cover is removed, the aperture is no longer closed and oxygen is able to enter the cell and the cell is rendered active.

It has been noticed that when oxygen is excluded from the zinc air cell, the cell has a no-load terminal voltage near to its nominal output voltage but that the terminal voltage drops to near zero with even a small load.

The cell is connected to a tamper evidence circuit 17 housed in the enclosure. The tamper evidence circuit 17 is connected to be powered by the cell 13 and includes evidence means which attains an indication state upon the circuit 17 being powered. The evidence means is able to retain the indication state after removal of power. The evidence means may be a bi-stable latch circuit or memory element which is switched from an unoperated state and set to a stable indication state when power is supplied to the tamper evidence circuit 17. Thus normally, with the cover closed and the cell sealed, the terminal voltage of the cell is too low to provide power to the tamper evidence circuit to set the circuit. However if the cover is removed, or even partially opened to an extent sufficient to unseal the aperture of the cell, the cell is activated and provides a sufficient terminal voltage to power the tamper evidence circuit. As explained hereinbefore powering of the tamper evidence circuit results in the evidence means attaining a state that indicates that the cover has been wholly or partially removed.

In addition a further detector or sensor 18 may be provided within the cover to sense removal of the cover. The detector 18 may be responsive to infra-red or other electromagnetic radiation. For example if the detector 18 is responsive to infra-red radiation, the detector would respond to body heat of a person tampering with the cover. If the cover is sealed to prevent ingress of ambient light into the enclosure, the detector may be responsive to light when the cover is opened. Another form of detector may comprise an ultra-sonic transmitter and receiver which is responsive to a change of ultra-sonic resonance of the enclosure as a result of opening of the cover. Instead of ultra sonic radiation, the detector may be responsive to other forms of radiation, for example electromagnetic including such radiation in the microwave region of the spectrum.

The detector 18 may be powered by the zinc air cell 13 via a power connection. Accordingly when the cover is closed the detector is not powered but becomes powered when the oxygen is able to enter the cell 13. Thus the detector would only be actuated when the cell 13 is active. Alternatively the detector may be permanently powered by a conventional battery. The detector 18 preferably includes bi-stable means so that actuation of the detector provides confirmation of opening of the cover.

Figure 2:
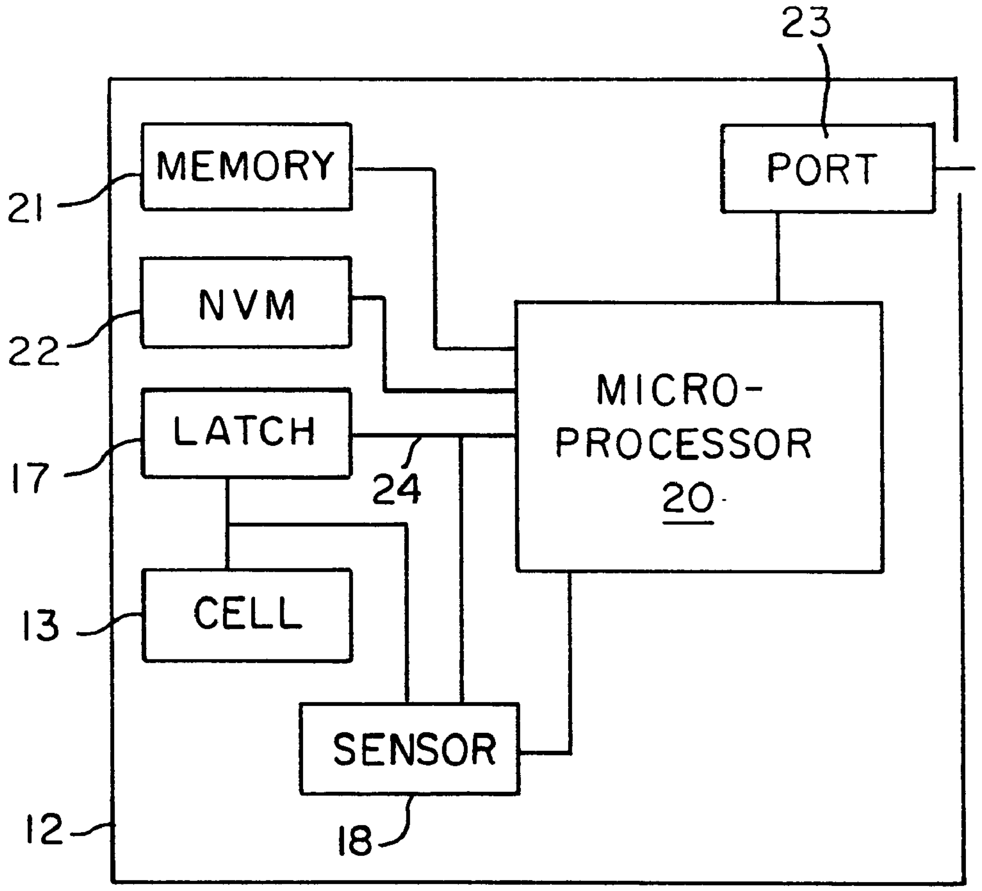

The circuit 10 protected by the secure enclosure 12 may be the electronic accounting and control circuits of a postage meter as shown in FIG. 2. The electronic accounting and control circuits include a microprocessor 20, memory 21 comprising ROM and RAM for storing program routines and data and non-volatile memory 22 for storing accounting data. A port 23 is provided for the connection of a user interface (not shown), printer (not shown) and a power supply (not shown) to the postage meter circuits housed in the secure enclosure. As described hereinbefore, the cell may power a bi-stable latch circuit 17 to provide evidence of tampering. If desired the bi-stable latch circuit may be connected to the microprocessor 20 to provide an inhibit signal on line 24 to the microprocessor which renders the microprocessor inoperative when the latch has been set as a result of power being applied by the cell to the latch. Accordingly not only does the latch provide evidence of tampering but also renders the postage meter in-operative. Similarly the sensor 18 may also provide an inhibit signal on line 24 to render the microprocessor inoperative as a result of detection of opening of the secure enclosure.

We claim:

1. Tamper detection apparatus for detecting unauthorised access to an element securely housed within a secure housing including a removable enclosure member, wherein the apparatus includes a sensor located within the housing and responsive to at least partial removal of the enclosure member, the sensor including a zinc air cell dependent for operation upon a supply of oxygen, a sealing member for normally preventing ingress of oxygen to the cell, the sealing member being so connected to the enclosure member that at least partial removal of the enclosure member displaces the sealing member to an extent sufficient to permit ingress of oxygen to the cell and activate the cell.

2. Apparatus as claimed in claim 1, wherein the sensor includes evidence means connected to receive power from the cell, the evidence means being driven to an operated stable state in response to activation of the cell.

3. Apparatus as claimed in claim 1, including a further sensor responsive to radiation permitted to enter the housing as a result of at least partial removal of the enclosure member.

4. Apparatus as claimed in claim 1, including a further sensor responsive to infra-red radiation permitted to enter the housing as a result of at least partial removal of the enclosure member.

5. Apparatus as claimed in claim 1, including a further sensor responsive to change in ultrasonic resonance of a space enclosed by the housing resulting from at least partial removal of the enclosure member.

6. Apparatus as claimed in claim 1, further including a radiation sensing unit operable to respond to entry of radiation into the housing as a result of at least partial removal of the enclosure member, the radiation sensing unit being connected to receive power from the cell and, when powered, being responsive to entry of radiation into the housing.

7. Apparatus as claimed in claim 1, wherein the element within the housing includes a microprocessor operative to receive a signal generated in response to activation of the cell, which signal is effective to inhibit further operation of the microprocessor.

* * * * *